UNITED STATES PATENT OFFICE.

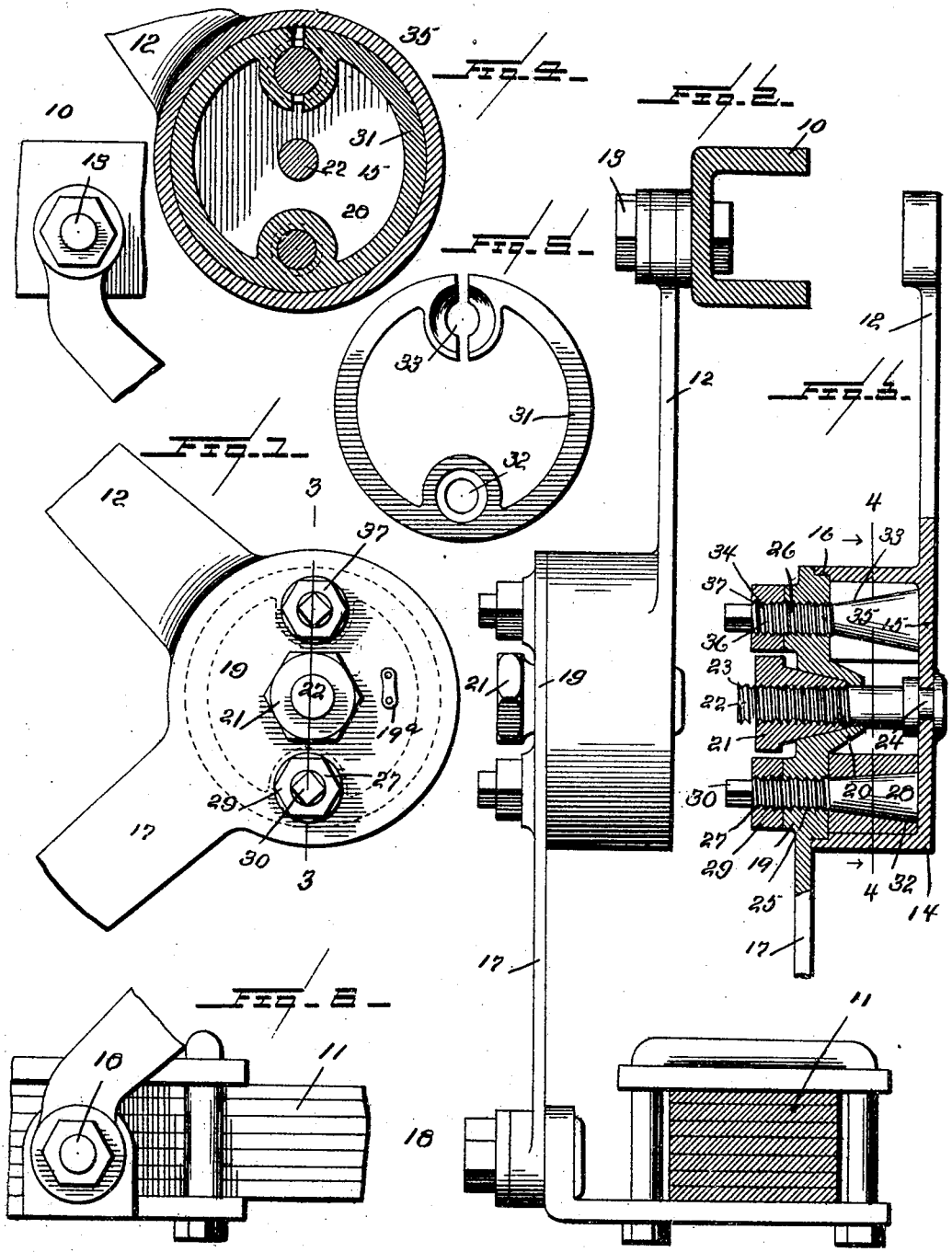

GEORGES GRILLIER, OF CHICAGO, ILLINOIS, ASSIGNOR TO THE AUTOMOBILE IMPORTING COMPANY, OF CHICAGO, ILLINOIS, A CORPORATION.

ANTIVIBRATION DEVICE FOR VEHICLES.

No. 809,501.　　　　Specification of Letters Patent.　　　　Patented Jan. 9, 1906.

Application filed April 26, 1905. Serial No. 257,495.

*To all whom it may concern:*

Be it known that I, GEORGES GRILLIER, a citizen of the Republic of France, residing at Chicago, in the county of Cook and State of Illinois, have invented new and useful Improvements in Antivibration Devices for Vehicles, of which the following is a specification.

This device is intended to take up the excessive vibration or jolts or undue springiness between the axles and chassis or frame of vehicles, such as automobiles.

The principal features consist in providing two bars or arms which are pivotally connected one to the chassis and the other to one of the usual springs on the automobile. These converge to a central casing, one arm being rigidly connected thereto, while the other turns in or on the casing. This latter arm is provided with a circular plate centrally pivoted to the casing, and this plate is provided with adjustable bolts and nuts to vary the friction. These bolts are tapered and pass through and adjust a rotatable segment or split ring, one of the bolts being principally for attaching one side of the plate to the split ring, while the other bolt is adapted to expand the ring, and thus produce a friction contact of any desired degree with the interior of the casing, thus producing a braking engagement between the ring and the casing. This split ring or segment and its adjustable device is one of the most important features of this invention. The segment can be adjusted so as to act as a brake on the vibrations of the automobile, and the movement of chassis or spring can be checked or greatly diminished by the arms, which are connected to the casing and its brake device. When the split ring is turned by the movement of the arms, the same pressure is effected on all parts of the casing.

In the accompanying drawings, Figure 1 is a side view showing parts of an automobile—the chassis and one of the side springs—to which is attached a device embodying the invention. Fig. 2 is a cross-section of the chassis and spring, showing an end elevation of the device. Fig. 3 is a vertical section on the line 3 3 of Fig. 1. Fig. 4 is a cross-section of the casing and interior parts, taken on the line 4 4 of Fig. 3. Fig. 5 is a view of the segment.

Referring specifically to the drawings, 10 indicates a chassis or frame, and 11 one of the side springs.

12 is an arm or bar pivotally attached at 13 to the chassis. This arm is provided at its lower end with a cylindrical casing 14, the said casing being integral (preferably) with the arm, the back of the casing being closed at 15 and the front edge thereof having a marginal inner rabbet 16.

17 is the lower arm, which is pivotally connected at 18 to the spring 11. The upper end of the arm 17 is provided with a circular plate 19, which fits in the rabbet 16. This plate 19 is provided centrally with a tapered tubular bearing or housing 20. 21 is a tapered nut which fits in same, and passing through is a bolt 22, screw-threaded at 23. This bolt is fixed to the back 15 of the casing at 24 and is intended principally for holding the parts assembled or together. The plate 19 has two screw-threaded holes 25 and 26 on opposite sides of the center. Through the hole 25 is inserted a bolt 27, having a tapered part 28. This bolt is provided with a set-nut 29 and has a squared end 30 for adjusting the same.

31 is a segmental or split ring provided with two diametrically opposite tapered holes or bores 32 and 33, the latter being located in the split end of the ring. The former one, 32, is engaged by the tapered bolt 27, which secures the ring to the plate 19.

34 is a tapered bolt similar to the bolt 27 and has a tapered part 35, which is inserted in the split hole 33 of the ring. This tapered part is preferably made slightly larger than the lower bolt. The bolt 34 is screw-threaded at 36 and passes through the screw-threaded hole 26 in the plate 19.

37 is a set-nut, and the outer end of the bolt is squared to admit adjusting the same.

The bolt 34 is for adjusting the segment 31, and by means thereof the tapered part of the bolt may be adjusted to press the sides of the split ring against the inner surface of the casing with any desired pressure, and thus produce a frictional contact between the two parts, which prevents the excessive vibration referred to. It is to be noticed that the wearing parts forming the brake or equalizer are all inside the casing and fully inclosed. These are intended to work in oil, with which the casing may be filled. The split ring is preferably made of bronze, the bolts of steel, and the casing of steel. The plate 19 is provided with any suitable oil-filling device, as at 19ª, in this instance a small oil-hole having a spring-cover being employed.

What I claim as new, and desire to secure by Letters Patent, is—

1. An antivibration device for vehicles, comprising two arms pivoted together and having respectively a casing and a friction-ring in contact therebetween, the pivot-bolt connecting the arms having a tapered sleeve-nut which fits in a tapered socket in one of the arms.

2. An antivibration device for vehicles, comprising two arms pivoted together, one arm having a circular casing around the pivot, and the other arm having a split ring within the casing and in continuous frictional contact therewith, and means to expand or contract the ring to vary the friction.

3. An antivibration device for vehicles, comprising two arms pivoted together, one arm having a cylindrical casing around the pivot and the other arm carrying a split ring within the casing and in frictional contact therewith, and a tapered bolt between the split ends of the ring, adjustable to expand or contract the ring.

4. An antivibration device for vehicles, comprising two arms pivoted together, one arm having a cylindrical casing around the pivot and the other arm having a cap-plate covering the end of the cylinder, a split ring secured to the cap-plate, and a tapered bolt secured to the plate and located between the ends of the split ring.

In testimony whereof I have signed my name to this specification in the presence of two subscribing witnesses.

GEORGES GRILLIER.

Witnesses:
PAUL PICARD,
SIGNA FELTSKOG.